2,744,430

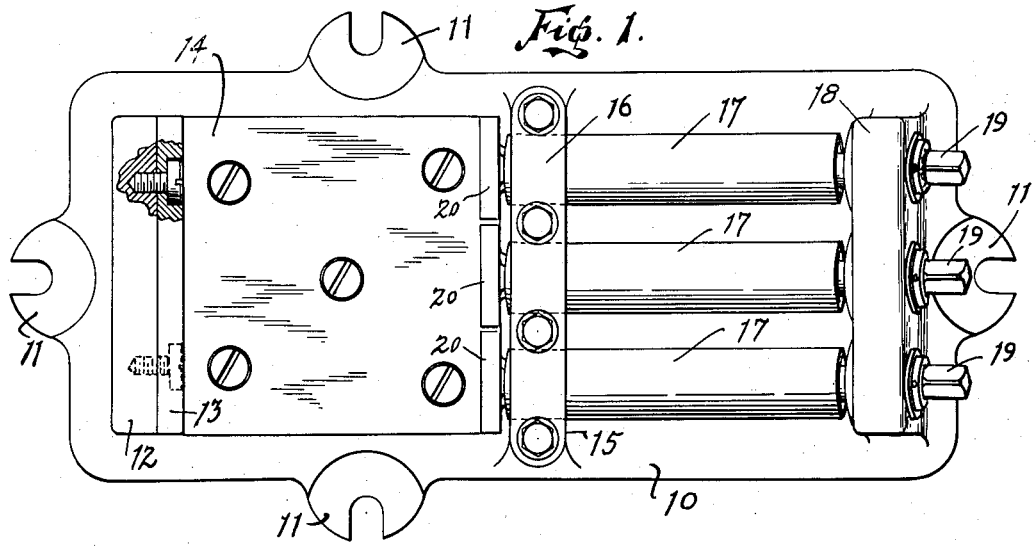
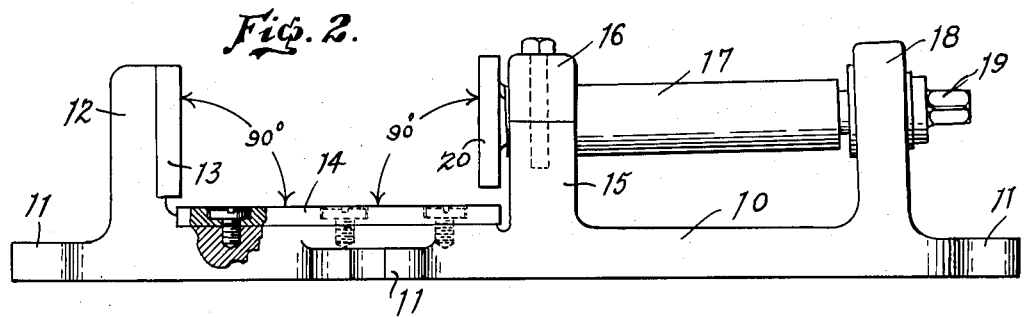
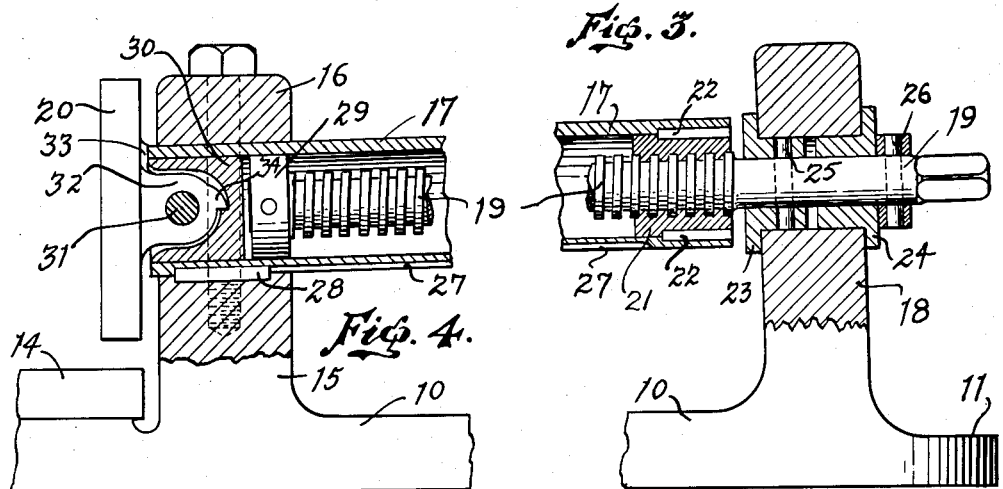
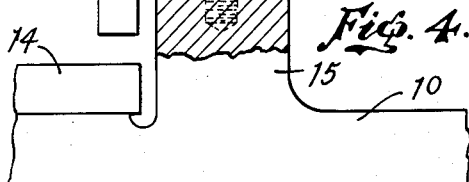
INVENTORS.
BERNARD A. McLAUGHLIN &
BY ERNEST W. KEAHEY.
ATTORNEY United States Patent Office 2,744,430
Patented May 8, 1956

MACHINE-TOOL VISE HAVING AN EXTENDIBLE AND DOWNWARDLY SLOPING SUPPORT FOR A MOVABLE JAW

Bernard A. McLaughlin, Santa Clara, and Ernest W. Keahey, Saratoga, Calif.

Application August 25, 1953, Serial No. 376,408

6 Claims. (Cl. 81—22)

Our present invention relates to an improved machine-tool vise and more particularly to a vise suitable for use in securing work upon the bed of a drill press, milling machine, or shaper where precision work is required of tool makers and die-sinkers, etc.

The main object of our invention is to provide a new and novel form of mounting for the movable clamping jaw of a machine tool vise, the clamping jaw being mounted on an extendible and downwardly sloping screw means so as to exert clamping and downward components of force upon a clamped workpiece and thus prevent any chattering and/or vertical displacement of the workpiece.

A further object of our invention is to provide a vise of the above character having a multiplicity of jaws each of which operate independently to exert a downward component of force at different parts along a body secured thereby.

Other objects and advantages of our invention will be in part pointed out hereinafter and in part evident to those skilled in the art as the description thereof taken in connection with the accompanying drawings, wherein there is shown by way of illustration and not of limitation a preferred embodiment of the invention.

In the drawing:

Figure 1 is a plan or top view of a vise constructed in accordance with our invention, Figure 2 is a side elevation of the vise shown in Figure 1, and Figures 3 and 4 are fragmentary views, partially in section and drawn on a slightly larger scale, showing details of construction.

A fault found in many machine tool vises now commonly used for securing work upon the bed plate of a milling machine, shaper or the like is that the work when subjected to transverse or lateral strains, and particularly where the movable jaw is controlled by the conventional screw arrangement, the work has a tendency to chatter. As a result the work may move out of its original point of alignment with the operating tool. Another disadvantage is that in vises of the prior art type an extreme pressure upon the work is required to prevent any possibility of the work becoming loose in the vise. It also happens that where a flat or shallow piece of work is being operated upon there is a tendency for the work to warp under the vise-clamping pressure.

To remedy the above defects and to also insure against any upward displacement of the work when held in the vise, we mount our clamping jaw upon a movable support that is inclined downwardly and moves at a slight angle with respect to the plane of the stationary jaw of the vise. The downward angle which we have found to be particularly satisfactory for our purposes, ranges somewhere between 3 and 10 degrees relative to the bed plane of the vise. In the drawing we have shown the screw 19 as disposed at an angle of 5 degrees. In this way the movable jaw of our vise exerts not only a lateral clamping pressure upon the object held in the vise, but also a downward component of force which will tend to firmly clamp the work upon the base plate of the vise and against the stationary jaw. For purposes of description the end of the vise having the stationary jaw is described as its forward portion and the opposite end as its rearward portion.

As shown in Figures 1 and 2 of the accompanying drawings the vise comprises a base portion 10 having split ears or bosses by which the vise may be secured to the bed of a machine tool with T-bolts as is standard practice. The base 10 has an elongated stationary jaw 12 upstanding therefrom and formed as an integral part thereof. This stationary jaw has a replaceable face plate 13 that is accurately machined preferably to an angle of 90 degrees with respect to a hardened precision-finished base plate 14 which is replaceable in the event of damage, the stationary jaw and base plate providing a precision angle therebetween for receiving a workpiece. Intermediate the ends of the base 10 there is an upstanding and laterally extending pedestal 15, designated the forward pedestal, which has a removable yoke or cap 16, the pedestal and its cap providing a slide-bearing for at least one axially slidable, tubular jaw-carrying member 17. At its other end the base 10 has a laterally extending rear pedestal 18 upstanding therefrom and preferably inclined forwardly and in which an operating screw 19 of the vise is mounted as will hereinafter appear, the screw entering coaxially and rotatably within the movable jaw-supporting tubular member, the common axis of said tubular member and screw sloping downwardly from the rear pedestal 18 and toward forward pedestal 15. As indicated in Fig. 2 of the drawing, the face plate 13 of the stationary jaw 12, as well as the base plate 14 may be of tool steel, both having their work-engaging faces ground so as to provide a work-receiving corner that defines an accurate precision angle, preferably of 90 degrees. Likewise, each movable jaw, here designated by numeral 20, is rockable to a limit position in which its work-engaging face stands at a 90 degree angle with respect to the base plate 14, at which time the work-gripping faces of said jaws are mutually parallel. However, as will hereinafter appear, the movable jaw 20 is pivotly mounted upon its movable support 17 so that it may assume an angle of less than 90 degrees with respect to the base plate 14, but in no event is it contemplated that this movable jaw 20 will assume an angle greater than 90 degrees with respect to the base plate 14. It is preferred to provide a single elongated stationary jaw 12 and face plate 13, and a plurality of transversely aligned movable jaws 20, so that a workpiece having varying irregularities or varying shapes may be clamped in the vise in the same manner of operation.

By now referring to Figure 3 of the drawings it will be seen that the movable jaw-supporting member 17 is of tubular construction. At its outer end adjacent pedestal 18 the member 17 has a screw-engaging nut 21 that is firmly keyed therein by keys 22, for advancement and retraction of the tubular member 17. These keys 22 prevent the nut 21 turning in the member 17 when the screw 19 is operated. As here shown the screw 19 extends through the rear pedestal 18 at a slight downward angle with respect to the base plate 14 of the vise and is secured rotatably in the rear pedestal by opposed collars 23 and 24. At the inner side of rear pedestal 18, the collar 23 is pinned to the screw 19 by a pin 25 and forms a thrust bearing for the screw 19. At the other side of the pedestal 18, the collar 24 is secured by a smaller collar and pin arrangement 26 and at its outer end the screw 19 is shown as having a squared end to which a suitable wrench, hand wheel or crank may be applied as is customary with vises of this character.

Now with reference to Figure 4 it will be noted that the forward end of the movable jaw-supporting member 17 extends through the pedestal 15 and is secured therein for sliding movement by the cap 16. At this point it will be noted that the movable member 17 also has a longitudinally extending keyway 27 that cooperates with a key 28 carried by the pedestal 15 to prevent rotation of the movable jaw-supporting member 17 upon rotation of the screw 19. A grinding collar 29 is pinned to the forward enclosed end of the screw 19 and moves longitudinally and rotatively within the tubular jaw-mounting member 17. Secured within and to the forward end of the movable jaw-supporting member 17 is a plug 30 having a hollowed indent in its forward face within which the movable jaw 20 is secured by means of a laterally extending horizontally disposed shaft or pin 31. For this purpose the movable jaw 20 is shown as having a centrally disposed boss 32 through which the pin 31 is extended. At this point it will also be noted that the movable jaw is free to pivot counter-clockwise (as viewed in Figs. 2 and 4) on pin 31. An abutment-forming extension 33 provided on the back face of an upper portion of the movable jaw 20 is adapted to abut the end of the movable jaw-supporting member 17 to prevent clockwise rocking of the work-engaging surface of the movable jaw 20 (as viewed in Figs. 2 and 4) beyond an angle of 90 degrees with respect to the base plate 14. However, the jaw is free to rock counterclockwise to an angle less than 90 degrees during its clamping contact with a workpiece. In addition to the abutment 33 we may provide a dog-like extension 34 on the boss 32 which, as shown, will engage with a notch formed at the bottom of the hollow plug 30.

With the above described arrangement it will be seen that when the screw 19 is turned in one direction or another the movable jaw-supporting member 17 will be caused to slide through the pedestal 15 toward or away from the stationary jaw and thus by a turning of the screw 19 the movable jaw 20 may be brought into and out of engagement with work placed upon the bed plate 14 of the vise.

While we have in Figures 1 and 2 of the drawings shown three indpendently movable and operable jaws 20 it will be understood that we may employ only a single movable jaw and supporting member or in other situations even more than three such similarly mounted jaws. With the multiple jaws 20, as here shown, it will be possible to exert a substantially uniform pressure upon an irregular body or upon three different similar pieces of work which might be jointly held upon the vise for corresponding machine tool operations.

While we have, for the sake of clearness and in order to disclose the invention so that the same can be readily understood, described and illustrated specific devices and arrangements, we desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described our invention, what we claim and desire to secure by Letters Patent is:

1. In a precision machine-tool vise, the combination of a supporting base, a surfaced work-supporting plate disposed at a forward end of said base, a stationary jaw mounted upon said base at said forward end and having a surfaced work-engaging plate disposed upstandingly at a precision angle to the plane of said work-supporting plate, a tubular member, a movable work-engaging jaw cooperating with said stationary jaw and mounted on said tubular member, a pedestal intermediate the ends of said base and providing a guide and support for said tubular member, said tubular member being slidably mounted upon said intermediate pedestal for movement in a direction downwardly inclined toward said stationary jaw, said work-engaging jaw being mounted upon a forward end of said tubular member, an operating screw, a second pedestal mounted upon a rear end of said base and forming a support and bearing for said operating screw, said operating screw being mounted for rotation on its axis in said rear pedestal for axially advancing and retracting said tubular member, and means connecting said tubular member with said screw, whereby upon a turning of said screw said movable work-engaging jaw will be moved in said inclined direction toward a vertex of said precision angle between said stationary jaw and work-supporting plate.

2. In a precision machine-tool vise, the combination of a supporting base, a work-supporting base plate at a forward end of said base, a stationary jaw extending upward from said forward end of said base and having a surfaced work-engaging face plate disposed at a precision angle to the plane of said work-supporting plate, a work-engaging movable jaw cooperating with said stationary jaw, a member carrying said movable jaw, a pedestal intermediate the ends of said base and providing a support for said jaw-carrying member, said jaw-carrying member being slidably mounted upon said intermediate pedestal for movement in a direction downwardly inclined towards said stationary jaw, said work-engaging jaw being mounted upon a forward end of said jaw-carrying member, a second pedestal mounted on said base and spaced rearwardly from said first pedestal, an operating screw mounted upon said second pedestal and extending toward said first pedestal, and means connecting said jaw-carrying member with said screw, whereby, upon selective turning of said screw, said movable work-engaging jaw will be moved in said inclined direction toward and away from said stationary jaw and work-engaging plate.

3. In a machine-tool vise, the combination of a base member having at its forward end a horizontally disposed precision-surfaced plate upon which work is positioned, a stationary jaw mounted on the forward end of the base member and having an elongated transversely extending work-engaging surface disposed in a plane at a right angle to the precision-surfaced plate of said base member, a tubular jaw-supporting member, means mounting said tubular jaw-supporting member on said base member for axial movement in a path downwardly inclined toward a vertex of the angle between said stationary jaw and the precision-surfaced plate, a work-engaging jaw pivotally mounted at its vertical central portion upon a forward end of said tubular jaw-supporting member for free forwardly and downwardly rocking movement about a horizontal axis, said work-engaging jaw having a work-engaging surface disposed in cooperating relation with the work-engaging surface of said stationary jaw, an operating screw rotatably mounted on said base member, said operating screw extending into and being operatively connected to said tubular jaw-supporting member so as to move said tubular jaw-supporting member along its downwardly inclined path towards said stationary jaw, and means limiting an upwardly and rearwardly rocking movement of said work-engaging jaw to a position in which its work-engaging surface becomes parallel to the work-engaging surface of said stationary jaw.

4. In a precision machine-tool vise, the combination of a base member having a vertically upstanding and laterally extending stationary jaw, a horizontally disposed work-supporting plate carried by said base member at a work-engaging side of stationary jaw, a forward bearing pedestal mounted intermediate the ends of said base member adjacent to said work-supporting plate and upstanding from said base member in spaced relation to said stationary jaw, a rear bearing-forming pedestal carried by said base member in rearwardly spaced relation to said forward bearing pedestal member, a tubular jaw-supporting member slidably mounted for axial movement through said forward pedestal, a work-engaging jaw member mounted upon a forward end of said tubular jaw-supporting member, an operating screw mounted at one end against axial movement upon the rear pedestal member and having its opposite end extending into said tubular jaw-supporting member, and threaded means carried by said tubular jaw-supporting member forming a driving connection with said operating screw, whereby said tubular member with the work-engaging jaw at its forward end will be moved into clamping engagment with work placed upon said work-supporting plate of the vise when said screw is turned, said tubular jaw-supporting member and said screw being mounted in said respective pedestals on a common axis which slopes from the rear pedestal downwardly and toward a corner formed by said work-engaging side of the stationary jaw and the work-supporting plate.

5. In a precision machine-tool vise, the combination of a base member having a single elongated laterally extending stationary jaw upstanding therefrom, a horizontally disposed elongated work-supporting plate carried by said base member at a work-engaging side of said stationary jaw and forming with said jaw a work-receiving corner that defines a precision angle, a forward bearing pedestal upstanding from and extending laterally across the top of said base member adjacent said work-supporting plate and in spaced relation to said stationary jaw, a rear bearing pedestal extending laterally across said base member in rearwardly spaced relation to said forward bearing pedestal, a plurality of tubular jaw-supporting members aligned transversely relative to the base and having portions adjacent their forward ends slidably mounted for axial movement through said forward bearing pedestal, the length of said elongated work-supporting plate and stationary jaw being commensurate to the transverse extent of the plurality of tubular jaw-supporting members, a work-engaging jaw member mounted upon the forward end of each of said tubular jaw-supporting members, an operating screw for each of said movable tubular jaw-supporting members, each of the screws being rotatable on its longitudinal axis and fixed against axial movement in said rear pedestal, the operating screws extending axially and rotatively in said tubular members, and threaded means carried by each of said tubular jaw-supporting members and forming a driving connection with the respective operating screw therein, whereby said tubular members and the work-engaging jaws at their forward ends may be moved independently into clamping contact with work placed in said work-receiving corner of the vise, said tubular members and screws being mounted in said pedestals so that the axes thereof slope from the rear pedestal downwardly and toward said corner which defines the precision angle of the vise.

6. A machine-tool vise, comprising a supporting base having a precision-surfaced horizontal work-supporting plate at a forward end portion of said base, a stationary jaw mounted upon said base at said forward end and having a precision-surfaced work-engaging plate providing, together with said horizontal work-supporting plate, a work-receiving corner that defines a precision angle, a forward pedestal and a rear pedestal relatively spaced longitudinally upon and upstanding from said base, a longitudinally extendible screw means, said forward and rear pedestals providing a guide and support for said longitudinally extendible screw means, a work-engaging jaw pivotally mounted at its vertically central portion on a forward end of said screw means for rocking movement about a transverse horizontal axis, said screw means having a portion rotatable on its longitudinal axis for selectively advancing and retracting the work-engaging jaw toward and from the stationary jaw, said portion of said screw means having a thrust bearing in said rear pedestal, said screw means sloping downwardly from said rear pedestal and toward said work-receiving corner, and said forward end of said screw means being provided with a stop means for limiting upwardly and rearwardly rocking movement of the work-engaging jaw beyond a position in which its work-engaging face is disposed at a right angle relative to the work-supporting plate, the work-engaging jaw being free to rock forwardly and downwardly so as to conform to a work piece clamped in the vise.

References Cited in the file of this patent

UNITED STATES PATENTS

| | | |
|---|---|---|
| 1,282,532 | Bochenek | Oct. 22, 1918 |
| 1,370,683 | Deater | Mar. 8, 1921 |
| 2,472,083 | Bartholdy | June 7, 1949 |
| 2,526,020 | Fuhr | Oct. 17, 1950 |